US012374513B2

(12) United States Patent
Sato

(10) Patent No.: US 12,374,513 B2
(45) Date of Patent: Jul. 29, 2025

(54) RUBBER STEM AND SWITCH APPARATUS

(71) Applicant: ALPS ALPINE CO., LTD., Tokyo (JP)

(72) Inventor: Hidetaka Sato, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 112 days.

(21) Appl. No.: 18/447,625

(22) Filed: Aug. 10, 2023

(65) Prior Publication Data

US 2023/0386766 A1 Nov. 30, 2023

Related U.S. Application Data

(63) Continuation of application No. PCT/JP2022/006274, filed on Feb. 16, 2022.

(30) Foreign Application Priority Data

Feb. 25, 2021 (JP) ................................ 2021-029180

(51) Int. Cl.
*H01H 13/14* (2006.01)
*H01H 13/04* (2006.01)
*H01H 13/20* (2006.01)

(52) U.S. Cl.
CPC ............ *H01H 13/14* (2013.01); *H01H 13/04* (2013.01); *H01H 13/20* (2013.01)

(58) Field of Classification Search
CPC ........ H01H 13/14; H01H 13/04; H01H 13/20; H01H 2215/006; H01H 2227/022;
(Continued)

(56) References Cited

U.S. PATENT DOCUMENTS 6,894,240 B2 * 5/2005 Komoto ................. H01H 13/20 200/406
10,403,451 B2 * 9/2019 Ito ........................ H01H 13/023
(Continued)

FOREIGN PATENT DOCUMENTS

JP S60-087125 U 6/1985
JP 2004-235006 8/2004
JP 2009-117073 5/2009

OTHER PUBLICATIONS

International Search Report for PCT/JP2022/006274 mailed on Apr. 26, 2022.

*Primary Examiner* — Lheiren Mae A Caroc
(74) *Attorney, Agent, or Firm* — IPUSA, PLLC

(57) ABSTRACT

A rubber stem for use in a switch apparatus having a dome-shaped invertible spring includes an operating portion on which a pressing action is performed, a skirt surrounding the operating portion and configured to be deformed in response to the pressing action performed on the operating portion, a base extending annularly along a lower edge of the skirt and supporting the lower edge of the skirt, and a pressing portion provided on a back side of the operating portion at a position facing a top of the invertible spring and configured to press the top of the invertible spring in response to the pressing action performed on the operating portion, wherein the skirt is formed of a low-hardness elastic material, and at least a part of the rubber stem other than the skirt is formed of a high-hardness elastic material.

9 Claims, 5 Drawing Sheets

(58) Field of Classification Search
CPC ......... H01H 2227/03; H01H 2229/046; H01H 13/48; H01H 3/12; H01H 3/125; H01H 13/70; H01H 13/705; H01H 13/7065; H01H 13/7073; H01H 13/26; H01H 13/50; H01H 13/506; H01H 13/52; H01H 13/84; H01H 13/85; H01H 2215/004; H01H 2215/018; H01H 2215/02
See application file for complete search history.

(56) References Cited

U.S. PATENT DOCUMENTS

2004/0182688 A1 9/2004 Komoto et al.
2023/0187148 A1* 6/2023 Lin ........................ H01H 13/20
200/341

* cited by examiner

FIG.5

| | COMPARATIVE EXAMPLE | | WORKING EXAMPLE | |
|---|---|---|---|---|
| | On | Off | On | Off |
| EVALUATION NUMBER | SPL [dB] | SPL [dB] | SPL [dB] | SPL [dB] |
| 1 | 43.3 | 50.6 | 39.7 | 41.3 |
| 2 | 44.5 | 50.0 | 39.9 | 41.1 |
| 3 | 44.6 | 49.7 | 40.1 | 41.3 |
| 4 | 44.3 | 49.4 | 40.0 | 41.3 |
| 5 | 44.4 | 50.2 | 40.1 | 41.5 |
| AVERAGE | 44.2 | 50.0 | 40.0 | 41.3 |

RUBBER STEM AND SWITCH APPARATUS

CROSS-REFERENCE TO RELATED APPLICATIONS

This application is a continuation of International Application PCT/JP2022/006274, filed on Feb. 16, 2022 and designated the U.S., which is based on and claims priority to Japanese patent application No. 2021-029180 filed on Feb. 25, 2021, with the Japanese Patent Office. The entire contents of these applications are incorporated herein by reference.

BACKGROUND OF THE INVENTION

1. Field of the Invention

The disclosures herein relate to rubber stems and switch apparatuses.

2. Description of the Related Art

Japanese Laid-open Patent Publication No. 2009-117073 discloses a configuration of a rubber spring that includes a pressing part and a leg part bendable upon the pressing part being pressed, with the leg part having a low-hardness rubber portion and a high-hardness rubber portion.

General rubber stems used for conventional switch apparatuses have a constant hardness throughout the entirety thereof. When the hardness of an entire rubber stem is reduced in order to extend the service life of a skirt, there is a risk that failure occurs in portions other than the skirt due to the reduced hardness.

SUMMARY OF THE INVENTION

According to one embodiment, a rubber stem for use in a switch apparatus having a dome-shaped invertible spring includes an operating portion on which a pressing action is performed, a skirt surrounding the operating portion and configured to be deformed in response to the pressing action performed on the operating portion, a base extending annularly along a lower edge of the skirt and supporting the lower edge of the skirt, and a pressing portion provided on a back side of the operating portion at a position facing a top of the invertible spring and configured to press the top of the invertible spring in response to the pressing action performed on the operating portion, wherein the skirt is formed of a low-hardness elastic material, and at least a part of the rubber stem other than the skirt is formed of a high-hardness elastic material.

According to at least one embodiment, the service life of a skirt is extended in a rubber stem for a switch apparatus having an invertible dome spring, and the occurrence of failure due to reduced hardness is reduced in portions other than the skirt.

BRIEF DESCRIPTION OF THE DRAWINGS

Other objects and further features of the present invention will be apparent from the following detailed description when read in conjunction with the accompanying drawings, in which:

FIG. 5 is a diagram illustrating results obtained from a working example of the switch apparatus according to the embodiment.

DESCRIPTION OF THE PREFERRED EMBODIMENTS

In the following, embodiments will be described with reference to the accompanying drawings. In the following description, for convenience, horizontal directions are referred to as an X-axis direction and a Y-axis direction, and a vertical direction (i.e., up-down direction) is referred to as a Z-axis direction.

<Outline of Switch Apparatus 100>

Figure 1:
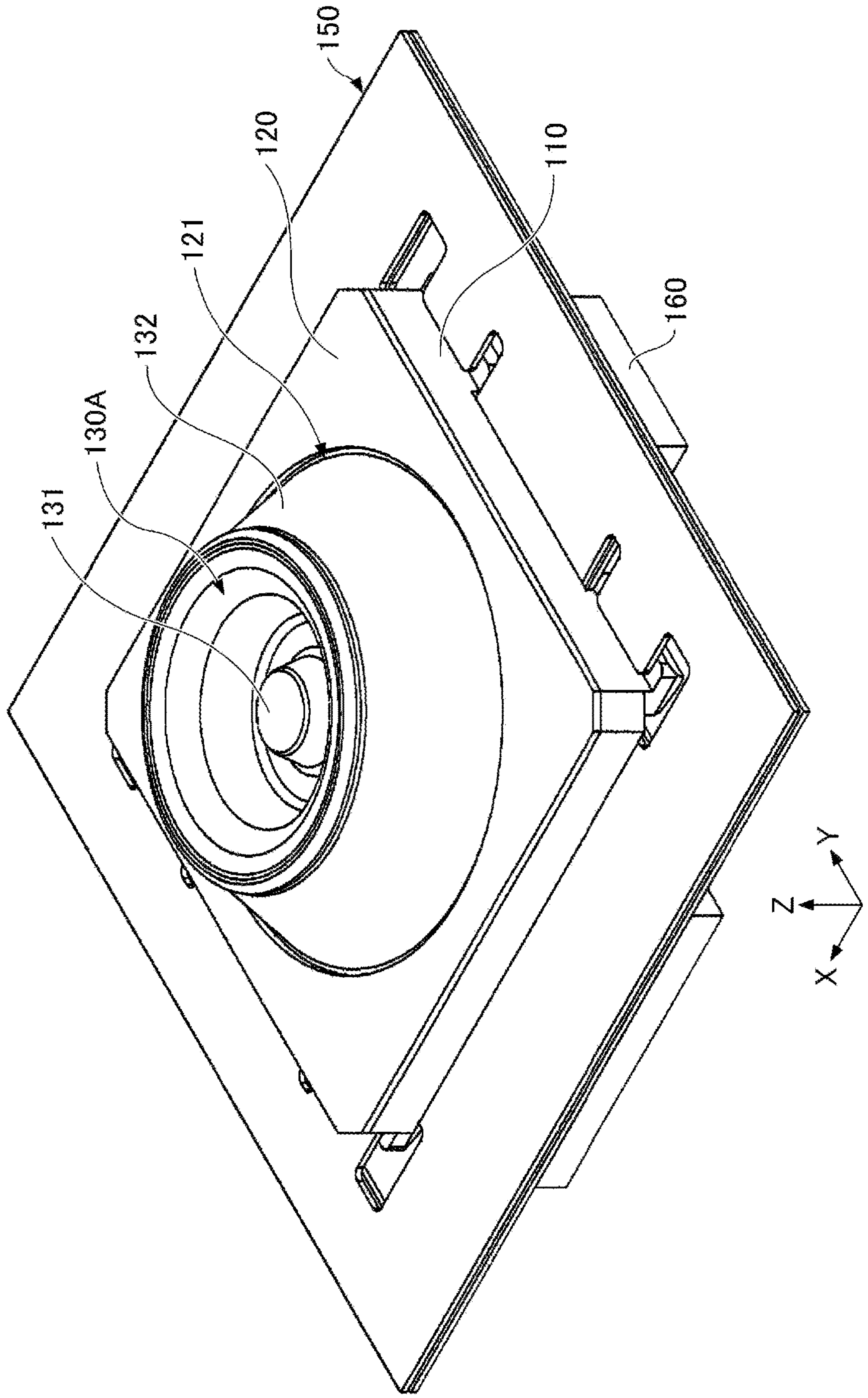
FIG. 1 is an axonometric view of the outer appearance of a switch apparatus according to an embodiment.

FIG. 1 is an axonometric view of the outer appearance of a switch apparatus 100 according to an embodiment. The switch apparatus 100 shown in FIG. 1 is a thin switch apparatus operated by pressing and used for a keyboard of a notebook computer or the like. The switch apparatus 100 includes an elastically deformable rubber stem 130, and is thus capable of providing a click feel in response to a pressing operation. As shown in FIG. 1, the switch apparatus 100 includes a case 110 that is thin in the vertical direction (Z-axis direction). A thin plate frame 120 made of metal is stacked on the upper surface of the case 110. The frame 120 has a circular opening 121. A skirt 132 of the rubber stem 130 protrudes upwardly (in the positive Z direction) from the opening 121. The rubber stem 130 has a substantially cylindrical operating portion 131 at the center of the rubber stem 130 (in the space surrounded by the skirt 132). In the switch apparatus 100, further, a thin-film membrane switch 150 and a flat support plate 160 are stacked one over the other on the lower side (i.e., toward the negative Z direction) of the case 110.

<Configuration of Switch Apparatus 100>

Figure 2:
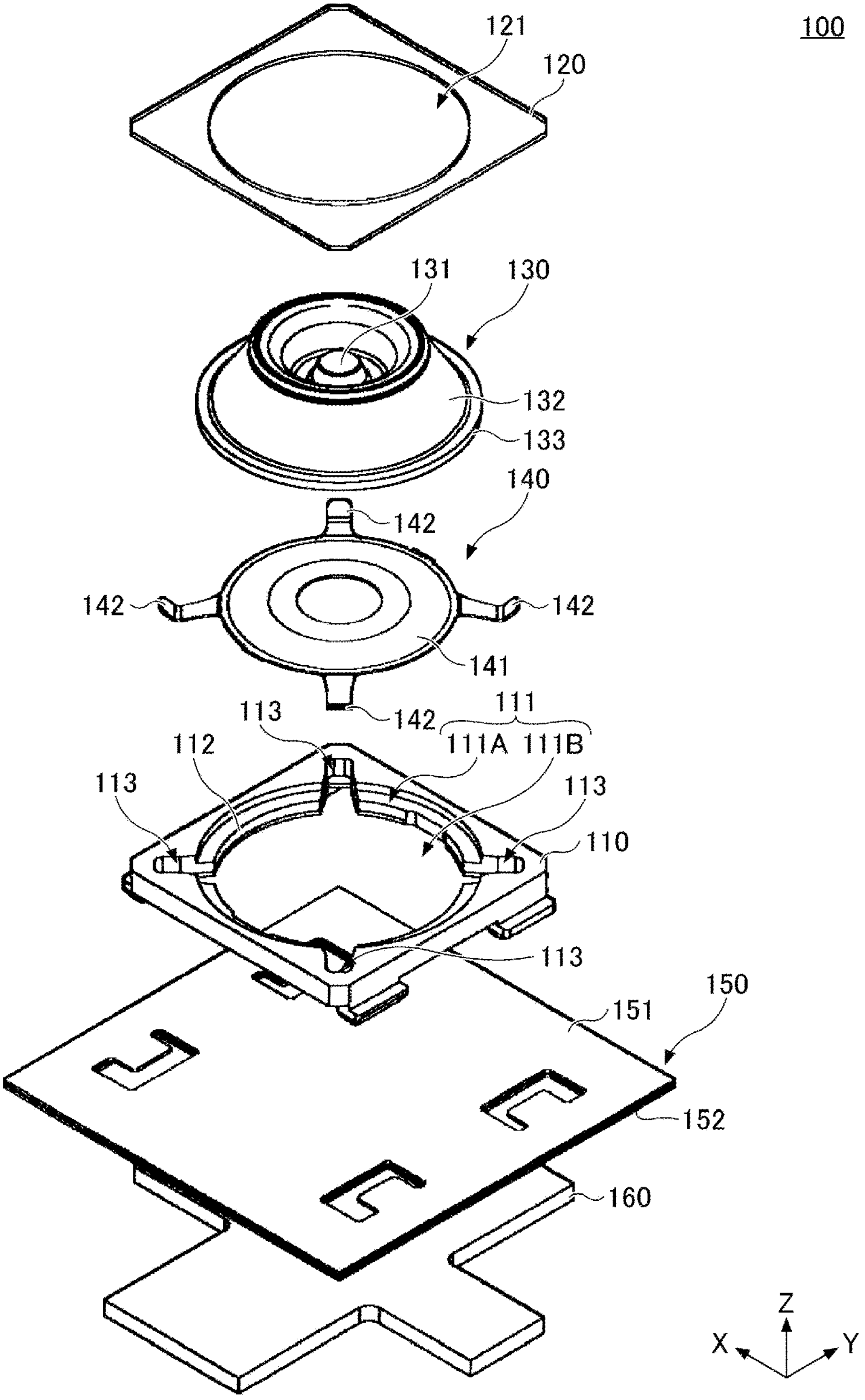
FIG. 2 is an exploded axonometric view of the switch apparatus according to the embodiment.
Figure 3:
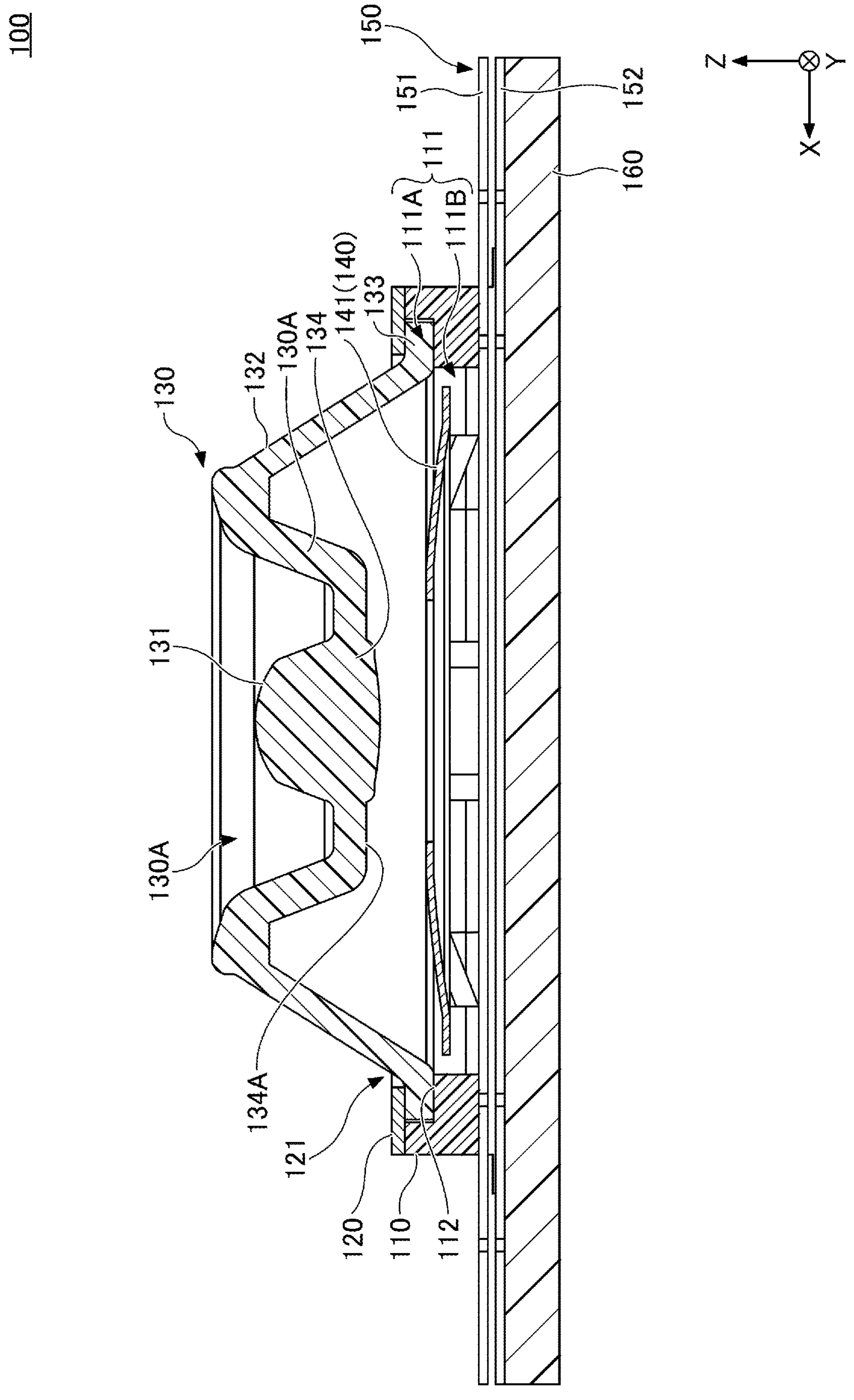
FIG. 3 is a cross-sectional view of the switch apparatus according to the embodiment taken along an XZ plane.

FIG. 2 is an exploded axonometric view of the switch apparatus 100 according to the embodiment. FIG. 3 is a cross-sectional view of the switch apparatus 100 according to the embodiment taken along an XZ plane.

As shown in FIGS. 2 and 3, the switch apparatus 100 includes the case 110, the frame 120, the rubber stem 130, a metal contact 140, the membrane switch 150, and the support plate 160.

The case 110 is a thin plate member made of resin and having a square shape in a plan view. The case 110 has an opening 111 that extends through the case 110 in the vertical direction. The opening 111 has a circular shape in the plan view. In the opening 111, an annular pedestal 112 is formed along the inner perimeter surface of the opening 111. As a result, the opening 111 has an upper large-diameter section 111A on the upper side (i.e., toward the positive Z direction) of the pedestal 112 and a lower small-diameter section 111B surrounded by the pedestal 112. A base 133 of the rubber stem 130 is disposed in the upper large-diameter section 111A. The metal contact 140 is disposed in the lower small-diameter section 111B. The case 110 has four slits 113 that extend outwardly in the radial direction from the inner perimeter surface of the opening 111 and that are formed at intervals of 90 degrees. The four legs 142 of the metal contact 140 are disposed in the four respective slits 113.

The frame 120 is a thin-plate metal member. The frame 120 has a square shape (i.e., the same shape as the upper surface of the case 110) in the plan view. The frame 120 is stacked on the upper surface of the case 110. As a result, the base 133 of the rubber stem 130 disposed in the upper large-diameter section 111A of the opening 111 of the case 110 is sandwiched between the frame 120 and the pedestal 112 of the case 110. The circular opening 121 is formed in the frame 120. The skirt 132 of the rubber stem 130 is inserted into the opening 121. With this arrangement, the opening 121 allows the skirt 132 of the rubber stem 130 to protrude above the frame 120.

The rubber stem 130 is a member that is pressed downward by an operator. The rubber stem 130 is formed of an elastic material (e.g., silicon, rubber, or the like). The rubber stem 130 includes a recessed portion 130A, the operating portion 131, the skirt 132, the base 133, and a pressing portion 134.

The recessed portion 130A has a shape recessed downward from the upper end of the rubber stem 130 at the center of the rubber stem 130. The recessed portion 130A has a circular shape in the plan view.

The operating portion 131 receives a downward force exerted by a pressing action performed by an operator. The operating portion 131 protrudes upward at the center of the rubber stem 130 from the upper surface of the bottom of the recessed portion 130A, and has a substantially cylindrical shape.

The skirt 132 extends downward while flaring outward from the upper edge of the recessed portion 130A, and has a skirt shape surrounding the recessed portion 130A. As shown in FIG. 3, the skirt 132 extends through the opening 121 of the frame 120, and protrudes above the frame 120. The skirt 132 elastically deforms (deflects) in response to a pressing action on the operating portion 131, thereby allowing the operating portion 131 to be lowered, and allowing the operating portion 131 to receive an operating load. When the operating load exceeds a given threshold, the skirt 132 is rapidly inverted into a shape in which the skirt shape is collapsed.

The base 133 annularly extends along the lower edge of the skirt 132, and supports the lower edge of the skirt 132. As shown in FIG. 3, the base 133 is sandwiched between the frame 120 and the pedestal 112 of the case 110.

The pressing portion 134 is a horizontal disk-shaped portion situated at the center of the rubber stem 130, and serves as the bottom of the recessed portion 130A described above. The pressing portion 134, which is provided on the back side of the operating portion 131 at a position facing the top of a dome 141 of the metal contact 140, presses the top of the dome 141 of the metal contact 140 in response to the pressing action performed on the operating portion 131 (i.e., in response to the lowering of the operating portion 131). The lower surface of the pressing portion 134 is a contact surface 134A. When the operating portion 131 is pressed, the contact surface 134A of the pressing portion 134 presses the top of the dome 141 of the metal contact 140.

The metal contact 140 is an example of an "invertible spring". The metal contact 140 is formed of a metal plate. The metal contact 140 includes a dome 141 and four legs 142 arranged at intervals of 90 degrees on the outer perimeter edge of the dome 141. The dome 141 is situated at the center of the metal contact 140. The dome 141 has a dome shape that is circular in the plan view and whose profile is convex upward. The dome 141 is disposed in the lower 13 small-diameter section 111B of the case 110. The top (i.e., center) of the dome 141 is pressed by the pressing portion 134 of the rubber stem 130 to initiate an inverting movement, which results in the profile being changed into convex downward. With this arrangement, the back side of the top of the dome 141 presses down the membrane switch 150, thereby placing the membrane switch 150 in an ON state. Each of the four legs 142 protrudes outwardly in the radial direction and downwardly from the outer perimeter edge of the dome 141. The four legs 142 are disposed in respective ones of the four slits 113 of the case 110. The four legs 142 touch the upper surface of the membrane switch 150 to support the metal contact 140.

The membrane switch 150 is a switch apparatus having the form of a thin sheet stacked on the lower surface of the case 110. The membrane switch 150 is made by laminating an upper sheet 151 and a lower sheet 152. A movable contact (not shown) made of a conductive film is provided at the center of the lower surface of the upper sheet 151. At the center of the upper surface of the lower sheet 152, a fixed contact (not shown) made of a conductive film is provided in an opposing relationship to the movable contact of the upper sheet 151. When not pressed by the pressing portion 134 of the rubber stem 130, the movable contact of the upper sheet 151 is separated from the fixed contact of the lower sheet 152, so that the membrane switch 150 is placed in an OFF state. When pressed by the pressing portion 134 of the rubber stem 130, the movable contact of the upper sheet 151 comes into contact with the fixed contact of the lower sheet 152, so that the membrane switch 150 is placed in an ON state.

The support plate 160 is a flat plate member stacked on the lower surface of the membrane switch 150. The support plate 160 supports the membrane switch 150 from below to prevent the entire structure of the membrane switch 150 from being bent downward when the rubber stem 130 is pressed.

<Functioning of Switch Apparatus 100>

The switch apparatus 100 configured as described above can be switched from an OFF state to an ON state by a downward (in the negative Z direction) pressing action performed on the operating portion 131 of the rubber stem 130.

Specifically, in the switch apparatus 100, the pressing portion 134 of the rubber stem 130 moves downward in conjunction with the elastic deformation (deflection) of the skirt 132 of the rubber stem 130 in response to a downward pressing action performed on the operating portion 131 of the rubber stem 130. The pressing portion 134 of the rubber stem 130 then presses the top of the dome 141 of the metal contact 140. When the load applied to the dome 141 of the metal contact 140 exceeds a given threshold, the dome 141 of the metal contact 140 is rapidly inverted. This inverting movement provides a click feel for the pressing action performed on the operating portion 131, and also causes the back side of the top of the dome 141 of the metal contact 140 to press the membrane switch 150. As a result, the membrane switch 150 is placed in the ON state.

In the switch apparatus 100, further, the rubber stem 130 undergoes a return movement based on its elastomeric force to return to its original undeformed shape when the pressing force on the rubber stem 130 is removed. Further, the metal contact 140 also undergoes a return movement based on its spring force to return to its original convex-upward shape. In conjunction with these movements, the pressing force applied by the metal contact 140 on the membrane switch 150 is removed. As a result, the membrane switch 150 is switched to the OFF state.

<Hardness Distribution in Rubber Stem 130>

Figure 4:
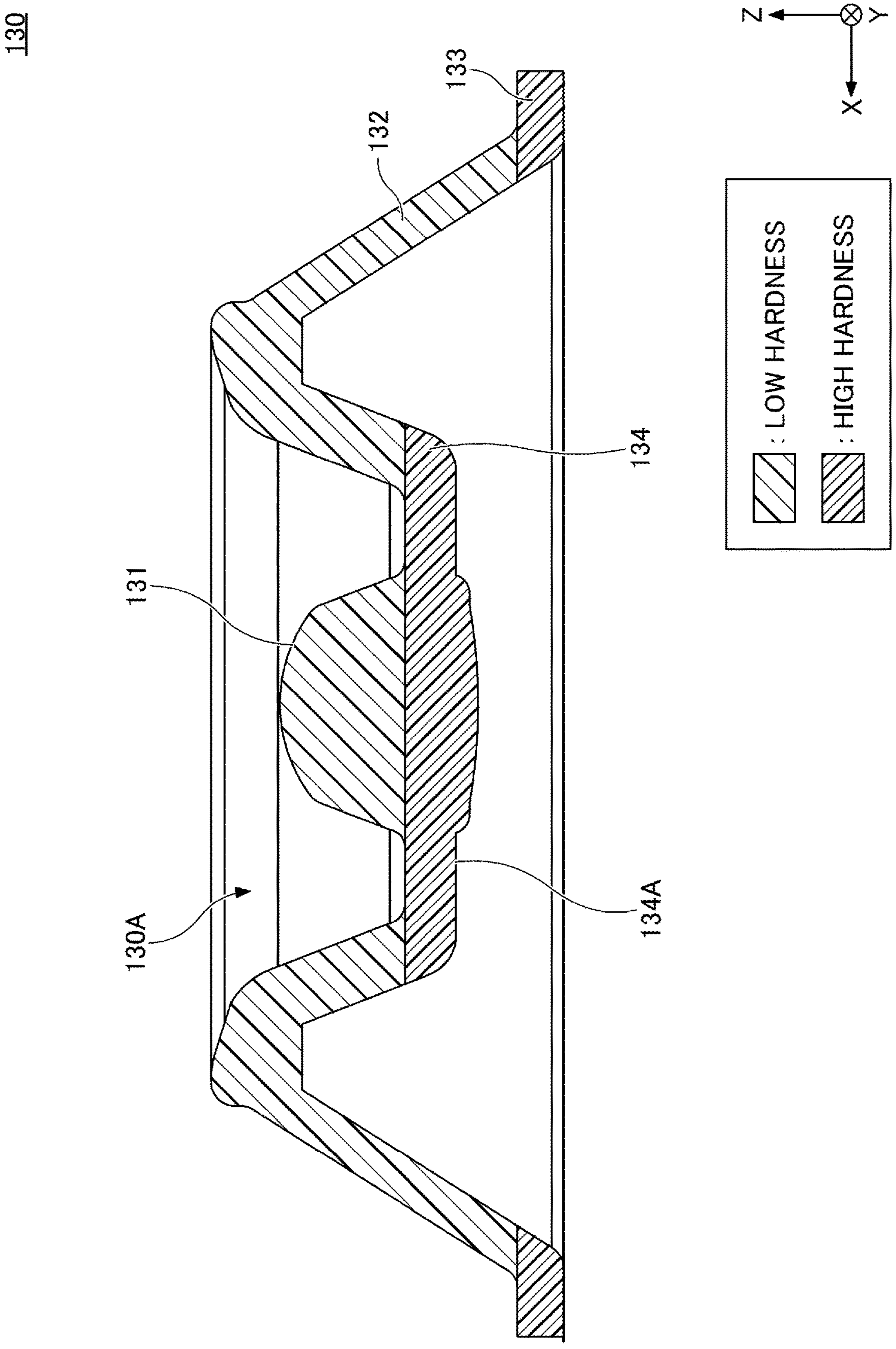
FIG. 4 is a cross-sectional view showing a hardness distribution in a rubber stem according to the embodiment.

FIG. 4 is a cross-sectional view showing a hardness distribution in the rubber stem 130 according to one embodiment. FIG. 4 shows the cross section of the rubber stem 130 with different hatchings depending on the hardness.

As shown in FIG. 4, the base 133 and the pressing portion 134 of the rubber stem 130 according to the embodiment are formed of a high-hardness elastic material. In particular, the rubber stem 130 according to the embodiment is configured such that the hardness of the high-hardness elastic material is Hs60° to Hs90° (which are Shore Hardness as defined in JIS 22246) and is higher than the hardness of a low-hardness elastic material.

As shown in FIG. 4, the rubber stem 130 according to the embodiment is further configured such that a portion other than the base 133 and the pressing portion 134 (such a portion includes the skirt 132) is formed of a low-hardness elastic material. In particular, the rubber stem 130 according to the embodiment is configured such that the hardness of the low-hardness elastic material is Hs30° to Hs60°.

In the rubber stem 130 according to the embodiment, portions made of the high-hardness elastic material and portions made of the low-hardness elastic material are seamlessly formed with each other by two color molding using the high-hardness elastic material and the low-hardness elastic material.

The skirt 132 of the rubber stem 130 according to the embodiment is formed of a low-hardness elastic material. With this arrangement, the skirt 132 has an increased flexibility, and the occurrence of a crack or the like resulting from the elastic deformation (deflection) of the skirt 132 is reduced, thereby giving the skirt 132 a long service life.

The pressing portion 134 of the rubber stem 130 according to the embodiment is formed of a high-hardness elastic material. With this arrangement, the speed of the inverting movement and the return movement of the metal contact 140 is reduced, which reduces the volume of operating sounds resulting from the inverting movement and the return movement of the metal contact 140.

If the hardness of the pressing portion 134 were low, for example, the pressing portion 134 compressed between the operating portion 131 and the metal contact 140 during a pressing action would rapidly expand, thereby accelerating the inverting movement of the metal contact 140. If the hardness of the pressing portion 134 were low, therefore, the operating sound of the metal contact 140 for the inverting movement would become large.

Moreover, if the hardness of the pressing portion 134 were low, the pressing portion 134 would not be able to sufficiently attenuate the acceleration force of a rapid return movement of the metal contact 140 upon the removal of a pressing force. If the hardness of the pressing portion 134 were low, therefor, the operating sound of the metal contact 140 for the return movement would become large.

The rubber stem 130 according to the embodiment is further configured such that the base 133 is formed of a high-hardness elastic material. This arrangement allows vibrations to be readily transmitted from a parts feeder when the parts feeder is used to align a plurality of rubber stems 130, thereby improving work efficiency in the alignment work.

Working Example

FIG. 5 is a diagram illustrating results obtained from a working example of the switch apparatus 100 according to the embodiment.

In the implementation of this working example, the switch apparatus 100 having the hardness distribution of the rubber stem 130 shown in FIG. 4 was used as a "WORKING EXAMPLE". It may be noted that the hardness of the base 133 and the pressing portion 134 of the rubber stem 130 was set to 80°, and the hardness of the other portions was set to 50°.

Further, in conjunction with the implementation of this working example, a switch apparatus in which the hardness of the rubber stem was constant throughout the entirety thereof was used as a "COMPARATIVE EXAMPLE". The hardness of the entire rubber stem was set to 50°.

In the implementation of the working example, a pressing action lasting for one second was performed five times for both the switch apparatus 100 of "WORKING EXAMPLE" and the switch apparatus of "COMPARATIVE EXAMPLE". Then, the sound pressure level generated by the inverting movement and the return movement of the metal contact was measured for each pressing action.

As illustrated in FIG. 5, the switch apparatus 100 of "WORKING EXAMPLE" exhibited an average sound pressure level of 40.0 dB for the inverting movement of the metal contact, and exhibited an average sound pressure level of 41.3 dB for the return movement of the metal contact.

As illustrated in FIG. 5, the switch apparatus 100 of "COMPARATIVE EXAMPLE" exhibited an average sound pressure level of 44.2 dB for the inverting movement of the metal contact, and exhibited an average sound pressure level of 50.5 dB for the return movement of the metal contact. According to the implementation of the working example, it was confirmed that the switch apparatus 100 according to the embodiment that partially increased the hardness of the pressing portion 134 successfully reduced the operating sound of the metal contact 140 for the inverting movement and the return movement.

As described above, the rubber stem 130 according to the embodiment is a rubber stem for the switch apparatus 100 having the dome metal contact 140 (i.e., invertible spring), and includes the operating portion 131 to be pressed, the skirt 132 having a skirt shape surrounding the operating portion 131 and deformed in response to a pressing action on the operating portion 131, the base 133 extending annularly along the lower edge of the skirt 132 and supporting the lower edge of the skirt 132, and the pressing portion 134 provided on the back side of the operating portion 131 at a position facing the top of the metal contact 140 and pressing the top of the metal contact 140 in response to the pressing action on the operating portion 131, wherein the skirt 132 is formed of a low-hardness elastic material, and at least a part of the portions excluding the skirt 132 is formed of a high-hardness elastic material. With the above-noted arrangement, the rubber stem 130 according to the embodiment enables the enhancement of flexibility of the skirt 132, which reduces the occurrence of a crack or the like resulting from the elastic deformation (deflection) of the skirt 132, thereby extending the service life of the skirt 132. In addition, the rubber stem 130 according to the embodiment may reduce the occurrence of failure caused by the reduced hardness of portions other than the skirt 132.

In the rubber stem 130 according to the embodiment, the pressing portion 134 is formed of a high-hardness elastic material.

With this arrangement, the rubber stem 130 according to the embodiment enables the reduction of speed of the inverting movement and the return movement of the metal contact 140, thereby reducing the volume of operating sounds resulting from the inverting movement and the return movement of the metal contact 140.

In the rubber stem 130 according to the embodiment, the base 133 is formed of a high-hardness elastic material.

With this arrangement, the rubber stem 130 according to the embodiment allows vibrations to be readily transmitted from a parts feeder when the parts feeder is used to align a plurality of rubber stems 130, thereby improving work efficiency in the alignment work.

In the rubber stem 130 according to the embodiment, the hardness of the low-hardness elastic material is Hs30° to Hs60°. The hardness of the high-hardness elastic material is Hs60° to Hs90°, and is higher than the hardness of the low-hardness elastic material.

With this arrangement, the rubber stem 130 according to the embodiment exhibits further enhanced desired results provided by the increased hardness of portions other than the skirt 132.

The rubber stem 130 according to the embodiment is formed as a single continuous piece by two color molding using a low-hardness elastic material and a high-hardness elastic material.

With this arrangement, the rubber stem 130 according to the embodiment is configured such that portions using the low-hardness elastic material and portions using the high-hardness elastic material are seamlessly formed with each other.

In the rubber stem 130 according to the embodiment, the low-hardness elastic material and the high-hardness elastic material are made of the same kind of material. In particular, the rubber stem 130 according to the embodiment is configured such that both the low-hardness elastic material and the high-hardness elastic material are silicon rubber.

Since the same kind of material is used for the low-hardness elastic material and the high-hardness elastic material in the rubber stem 130 according to the embodiment, these two elastic materials have the same contraction rate, and can thus be easily molded. Further, separation is unlikely to occur at the interface between these materials. Use of silicon rubber for both the low-hardness elastic material and the high-hardness elastic material in the rubber stem 130 according to the embodiment allows these materials to be readily made into one seamless piece by two color molding.

Moreover, the switch apparatus 100 according to the embodiment includes the rubber stem 130, the metal contact 140, and the membrane switch 150 that is switched to the ON state by the inverting movement of the metal contact 140.

With this arrangement, the switch apparatus 100 according to the embodiment enables the extension of service life of the skirt 132 in the rubber stem 130. In addition, the switch apparatus 100 according to the embodiment brings about the desired results associated with the increased hardness of portions of the rubber stem 130 other than the skirt 132.

Although an embodiment of the present invention has heretofore been described in detail, the present invention is not limited to the embodiment, and various variations or modifications may be made within the scope and spirit of the invention defined in the claims.

For example, all the portions of the rubber stem 130 other than the skirt 132 may be formed of a high-hardness elastic material.

Further, the switch apparatus 100 may include the rubber stem 130, the metal contact 140, and a substrate having a fixed contact that is placed in a conductive state by an inverting movement of the metal contact 140, for example.

What is claimed is:

1. A rubber stem for use in a switch apparatus having a dome-shaped invertible spring, comprising:

an operating portion on which a pressing action is performed;

a skirt surrounding the operating portion and configured to be deformed in response to the pressing action performed on the operating portion;

a base extending annularly along a lower edge of the skirt and supporting the lower edge of the skirt; and a pressing portion provided on a back side of the operating portion at a position facing a top of the invertible spring and configured to press the top of the invertible spring in response to the pressing action performed on the operating portion, wherein the skirt is formed of a low-hardness elastic material, and at least a part of the rubber stem other than the skirt is formed of a high-hardness elastic material, and wherein the base is formed of the high-hardness elastic material.

2. The rubber stem as claimed in claim 1, wherein the pressing portion is formed of the high-hardness elastic material.

3. The rubber stem as claimed in claim 1, wherein all of the rubber stem except for the skirt is formed of the high-hardness elastic material.

4. The rubber stem as claimed in claim 1, wherein a hardness of the low-hardness elastic material is Hs30° to Hs60°, and wherein a hardness of the high-hardness elastic material is Hs60° to Hs90° and is higher than the hardness of the low-hardness elastic material.

5. The rubber stem as claimed in claim 1, wherein the rubber stem is made by two color molding using the low-hardness elastic material and the high-hardness elastic material.

6. The rubber stem as claimed in claim 1, wherein the low-hardness elastic material and the high-hardness elastic material are made of a same kind of material.

7. The rubber stem as claimed in claim 6, wherein the low-hardness elastic material and the high-hardness elastic material are silicon rubber.

8. A switch apparatus comprising:

the rubber stem of claim 1;

the invertible spring; and a membrane switch configured to be placed in an ON state by an inverting movement of the invertible spring.

9. A switch apparatus comprising:

the rubber stem of claim 1;

the invertible spring; and a substrate.

* * * * *